United States Patent [19]
Charles et al.

[11] Patent Number: 6,026,738
[45] Date of Patent: Feb. 22, 2000

[54] SELF-CONTAINED CRUST FACTORY

[75] Inventors: James P. Charles, Sturgeon Bay; Dennis A. Dolski, Green Bay; Joseph A. Lasee, DePere, all of Wis.

[73] Assignee: DOC Machines Works, Inc., Green Bay, Wis.

[21] Appl. No.: 09/390,149

[22] Filed: Sep. 3, 1999

[51] Int. Cl.[7] .............................. A21C 9/00; A21C 11/00; A47J 37/00
[52] U.S. Cl. ................................. 99/349; 99/353; 99/432; 99/450.1; 100/319; 100/320; 100/326; 425/112; 425/394
[58] Field of Search ............................... 99/339, 340, 349, 99/353–355, 372, 373, 386, 443 R, 443 C, 449, 450, 450.1–450.7; 100/319, 320, 326, 222, 237, 144, 315, 218; 425/112, 394, 89, 441, 167; 426/513, 512, 523, 391, 496, 549

[56] References Cited

U.S. PATENT DOCUMENTS

| | | |
|---|---|---|
| 740,346 | 9/1903 | Williams . |
| 1,725,834 | 8/1929 | Smith . |
| 3,565,015 | 2/1971 | Jorgensen ............................ 99/349 X |
| 3,716,319 | 2/1973 | Norman ............................... 425/317 X |
| 3,735,692 | 5/1973 | Marchignoni .............................. 99/353 |
| 3,814,005 | 6/1974 | Widdel ................................... 99/372 X |
| 4,214,650 | 7/1980 | John et al. ............................. 99/349 X |
| 4,683,813 | 8/1987 | Schultz ....................................... 99/353 |
| 4,724,755 | 2/1988 | Escamilla ................................... 99/353 |
| 4,973,240 | 11/1990 | Reilly ...................................... 425/195 |
| 5,074,778 | 12/1991 | Betts, Jr. et al. ..................... 99/432 X |
| 5,176,922 | 1/1993 | Balsano et al. ...................... 100/237 X |
| 5,253,565 | 10/1993 | Burton ................................. 99/372 X |
| 5,396,833 | 3/1995 | Atwood et al. ............................ 99/353 |
| 5,417,149 | 5/1995 | Raoi et al. ............................ 100/319 X |
| 5,469,779 | 11/1995 | Amore et al. ........................ 99/432 X |
| 5,591,470 | 1/1997 | Bartley .................................... 426/391 |
| 5,630,358 | 5/1997 | Patel ......................................... 99/349 |
| 5,649,473 | 7/1997 | Lawrence .............................. 425/89 X |
| 5,921,170 | 7/1999 | Khatchadourian et al. ....... 99/450.1 X |

*Primary Examiner*—Timothy Simone
*Attorney, Agent, or Firm*—Andrius, Sceales, Starke & Sawall

[57] ABSTRACT

A self-contained pizza crust factory for creating a docked, formed pizza crust from a raw dough ball and positioning the crust on a crust container. The pizza crust factory includes an infeed conveyor belt that transports the ball of raw dough from an infeed end of the apparatus to a press assembly. The press assembly includes an upper platen and a lower platen positioned on opposite sides of the infeed conveyor belt. The upper platen of the press assembly is heated and in close contact with a crust die plate that is removably secured within a die holder assembly. The die holder assembly includes a pair of side supports that are pivotally movable between a locking position and a release position, such that the crust die plate can be easily removed and replaced from within the die holder assembly. A docking station is positioned downstream from the press assembly and receives the formed crust from the press assembly. The docking station includes a rotatable docker pin roll that perforates the crust as the crust moves through the docking station. A panner conveyor belt that supports a crust container is positioned downstream from the docking station. The speed of the panner conveyor belt and an outfeed conveyor of the docking station are synchronized such that the formed crust is correctly positioned on the crust container. The apparatus of the present invention continuously operates as long as dough balls are placed upon the infeed conveyor belt.

23 Claims, 6 Drawing Sheets

SELF-CONTAINED CRUST FACTORY

BACKGROUND OF THE INVENTION

The present invention generally relates to a device for forming a crust. More specifically, the present invention relates to a self-contained pizza crust factory that sequentially presses a raw dough ball into the desired shape for a pizza crust, docks the formed crust and positions the formed, docked crust on a crust container, such as a pizza pan or wire mesh screen.

Counter-top appliances for forming a disk-shaped pizza crust from a ball of raw dough have been known and available for years. In typical counter-top presses, the raw dough ball is placed beneath a press member that can be operated to apply pressure to the dough ball and press the supply of dough outward to form a general disk-shaped crust. Typically, the crust is formed on a generally flat surface and transferred to a crust container, such as a pizza pan or wire mesh screen. Some counter-top press assemblies form the crust directly in the pizza pan such that the pan can be removed from the press with the crust already in place.

While counter-top pizza crust presses work reasonably well to create the desired shape for the crust, they suffer from several significant drawbacks. First, the crust formed by the counter-top assembly needs to be manually perforated, or docked, to form a crust having the improved properties provided by the docking process. Additionally, the counter-top press assemblies do not allow for the continuous, automated production of a series of crusts.

In large scale, commercial bakeries, pizza crusts are continuously formed along a conveyor system that may extend for hundreds of feet. In an initial portion of the conveyor system, raw dough balls are pressed into the desired crust shape and are subsequently transferred by a moving conveyor section to a downstream docking station. The downstream docking station, which is typically a separate unit from the press assembly, receives the formed crusts and docks the crusts by passing them through a rotating pin wheel. After leaving the docking station, the formed, docked crusts typically enter into a third separate section that places the raw crusts on a support surface for baking the crusts. Although the industrial conveyor system for forming pizza crusts from raw dough balls is an effective and rapid method of forming a large number of pizza crusts, the crust forming conveyor system clearly cannot be used in a single site restaurant, such as a pizzeria.

Therefore, a need exists for a self-contained, mobile pizza crust factory that presses a dough ball into the desired crust shape, docks the crust once it has been formed and transfers the formed, docked crust onto a crust container. Additionally, it is an object of the present invention to provide a self-contained pizza crust factory that allows pizza crusts to be continuously formed from a succession of raw dough balls. Further, it is an object of the present invention to provide a mobile, self-contained pizza crust factory that can be used within a pizzeria. It is a further object of the present invention to provide a pizza crust factory that includes a removable crust die plate so that the shape and size of the crust formed by the pizza crust factory can be easily adjusted based on user specifications. It is an additional object of the present invention to provide a self-contained pizza crust factory that docks a formed pizza crust prior to its insertion onto a crust container. Finally, it is an additional object of the present invention to coordinate the discharge of the formed, docked crust from the docking station and the position of the crust container such that the docked, formed crust can be accurately positioned on the crust container.

SUMMARY OF THE INVENTION

The present invention is a self-contained pizza crust factory that transforms a raw dough ball into a docked pizza crust positioned on a crust container. The pizza crust factory is completely contained on a mobile support frame that allows the pizza crust factory to be repositioned in a pizzeria or other establishment as desired. The pizza crust factory includes an infeed conveyor belt that receives a dough ball at its infeed end. The infeed conveyor belt operates to transport the dough ball from the infeed end to a press assembly positioned between the infeed end and the discharge end of the infeed conveyor belt.

The press assembly includes heated upper and lower platens positioned on opposite sides of the infeed conveyor belt. The upper platen is contained within a die holder assembly and is in contact with a crust die plate. The entire die holder assembly is movable toward and away from the infeed conveyor belt such that the crust die plate can press the dough ball into the desired crust shape while the dough ball is supported on the infeed conveyor belt. The die holder assembly includes a pair of movable side supports that are mounted to each side of the upper platen. The side supports function to hold the crust die plate in contact with the heated upper platen. The side supports are each pivotable between a locking position in which the crust die plate is pressed into contact with the upper platen and a release position in which the crust die plate can be removed from the die holder assembly. Each of the side supports is connected at one end to a locking assembly that can be operated to secure the side supports in their locking position to hold the crust die plate securely in contact with the upper platen.

Once the crust has been formed by the press assembly, the infeed conveyor belt is indexed forward to transport the formed crust downstream to a docking station also supported by the support frame of the pizza crust factory. The docking station includes a docker infeed conveyor belt that receives the formed crust and transports the formed crust between a docker pin roll and a mating smooth roller. The docker pin roll includes a plurality of pins extending radially from the rotational axis of the docker pin roll. The pins extending from the docker pin roll perforate the formed crust such that the crust is docked by the docking station.

After the crust has been docked by the rotating docker pin roll, the crust is transferred to a docker outfeed conveyor belt. The docker outfeed conveyor belt is driven at the same speed as the docker pin roll such that the docked crust can be smoothly transferred onto the docker outfeed conveyor belt.

A crust sensor is positioned above the docker outfeed conveyor belt to sense the leading edge of the crust traveling on the docker outfeed conveyor belt. Upon detecting the presence of the leading edge of a formed crust, the crust sensor sends a signal to the electronic controller for the pizza crust factory. The electronic controller begins operation of a panner conveyor belt positioned downstream from the docker outfeed conveyor belt. The panner conveyor belt supports a crust container that is accurately positioned on the panner conveyor belt by a guide member. As the panner conveyor belt is operated, the crust container is moved beneath the formed crust leaving the docker outfeed conveyor belt to accurately position the crust on the crust container.

The pizza crust factory of the invention includes three separate drive motors that are coupled to the infeed conveyor belt, the conveyor belts and smooth roller in the docking station, and the panner conveyor belt. The drive motors control the speed of the individual conveyor belts such that the conveyor belts operate to transport the dough ball through the pizza crust factory until the crust is docked and accurately positioned on a crust container.

The pizza crust factory includes a series of sensors that detect the position of the dough ball and pizza crust as it is processed through the pizza crust factory. A pair of sensors detect whether a dough ball is positioned beneath the press assembly to ensure that the press assembly operates only when a dough ball is accurately positioned therebelow.

The control panel of the pizza crust factory includes a pair of temperature dials that allow the user to accurately and independently set the temperature of the upper platen and the lower platen. Additionally, the control panel includes a press timer that allows the user to control the dwell time of the upper platen when the crust is being formed on the infeed conveyor belt.

The present invention presents a self-contained, mobile pizza crust factory that receives a raw dough ball at an infeed end and transports the dough ball through several processing steps, including pressing of the dough ball into the desired crust shape, docking the formed crust, and positioning the docked, formed crust on a crust container, such as a wire mesh screen or pizza pan. The self-contained pizza crust factory can be transported to any desired location and simply needs a source of electric power to be operated.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE DRAWINGS

Figure 1:
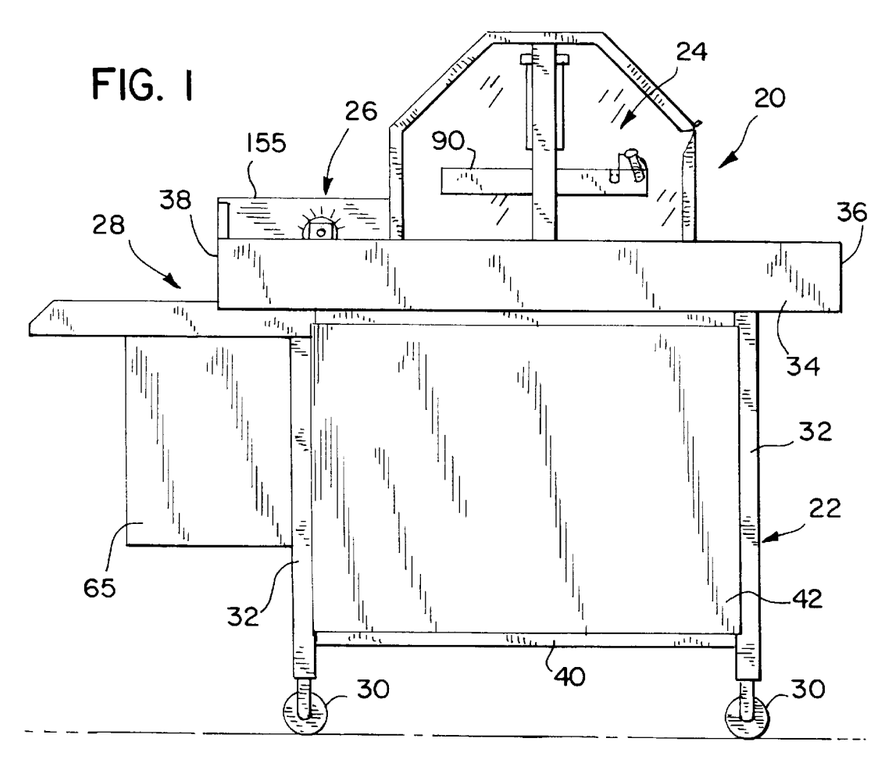
FIG. 1 is a side view of the self-contained pizza crust factory of the present invention.

A self-contained pizza crust factory 20 of the present invention is shown in FIG. 1. The pizza crust factory 20 receives a ball of raw dough and presses the dough into the desired crust shape, docks the formed crust, and transfers the formed and docked crust onto a crust container, such as a pizza pan or wire mesh screen.

The pizza crust factory 20 generally includes a support frame 22 onto which a press assembly 24, a docking station 26 and a panner 28 are sequentially mounted. The support frame 22 includes a plurality of casters 30 that allow the entire pizza crust factory 20 to be easily moved around the kitchen in which it is placed. The pizza crust factory 20 of the present invention is small enough in size such that it can be positioned in the kitchen area of a typical pizzeria so that the pizza crust factory 20 can be used to make fresh crusts for use in the pizzeria. In the embodiment of the invention shown in FIG. 1, the overall height of the pizza crust factory 20 is approximately 5'4", while the length of the pizza crust factory 20 is approximately 6'2". All of the components contained within the pizza crust factory 20 are electrically operated such that a single power cord (not shown), typically 220 volts, can be used to operate the entire pizza crust factory 20.

The support frame 22 for the pizza crust factory 20 includes a plurality of spaced vertical uprights 32, each of which includes one of the casters 30. The vertical uprights 32, in turn, are joined at their upper ends to a pair of horizontal side rails 34. The horizontal side rails 34 of the support frame 22 extend between an upstream end 36 and a downstream end 38 of the pizza crust factory 20. As will be described in detail below, the pizza crust factory 20 operates to form the crust as the raw dough moves from the upstream end 36 to the downstream end 38.

In addition to the horizontal side rails 34, the support frame 22 includes lower horizontal struts 40 to further support the vertical uprights 32 and side panels 42. The side panels 42 enclose an open storage area between the spaced vertical uprights 32 that receives the operating components for the pizza crust factory 20, as will be described in detail below. In the preferred embodiment of the invention, the entire support frame 22, including the horizontal side rails 34, the vertical uprights 32, and the side panels 42 is formed from a metallic material that can be easily cleaned and sanitized.

Figure 2:
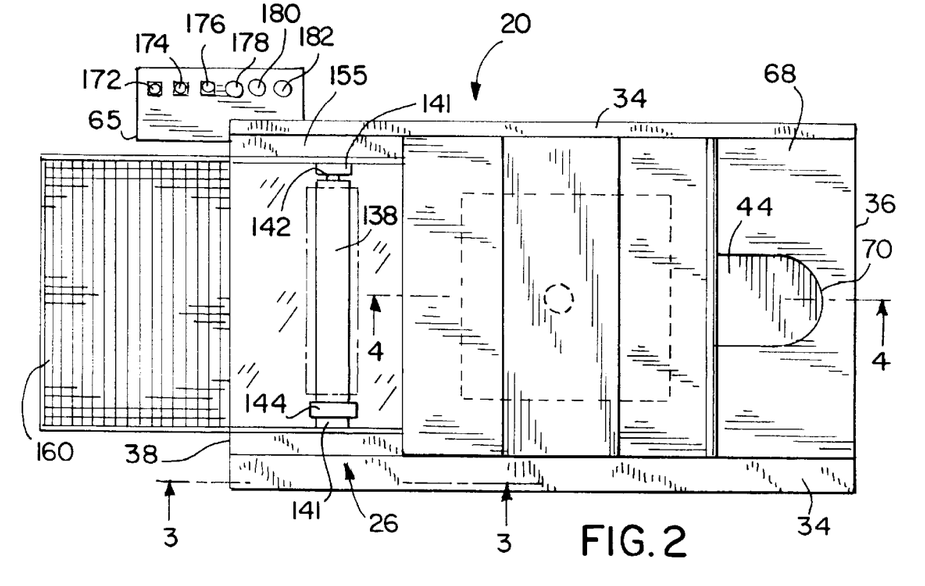
FIG. 2 is a top plan view of the pizza crust factory.
Figure 3:
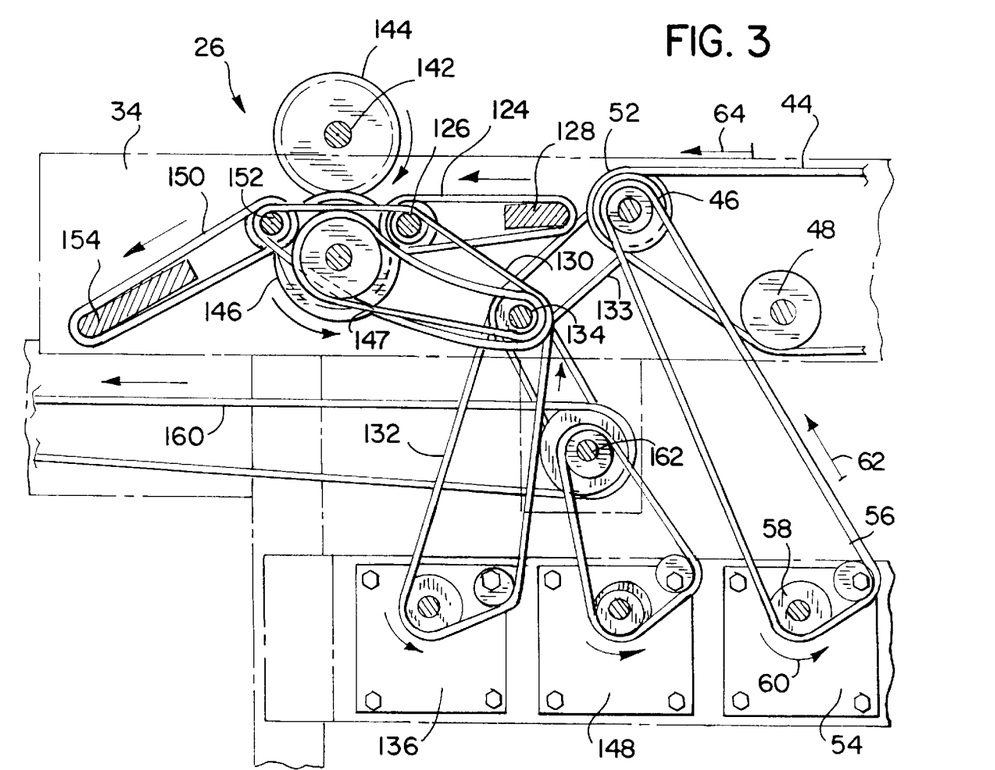
FIG. 3 is a partial section view taken along line 3—3 of FIG. 2 illustrating the interconnection between the drive motors and drive shafts for the conveyors of the pizza crust factory of the present invention.
Figure 4:
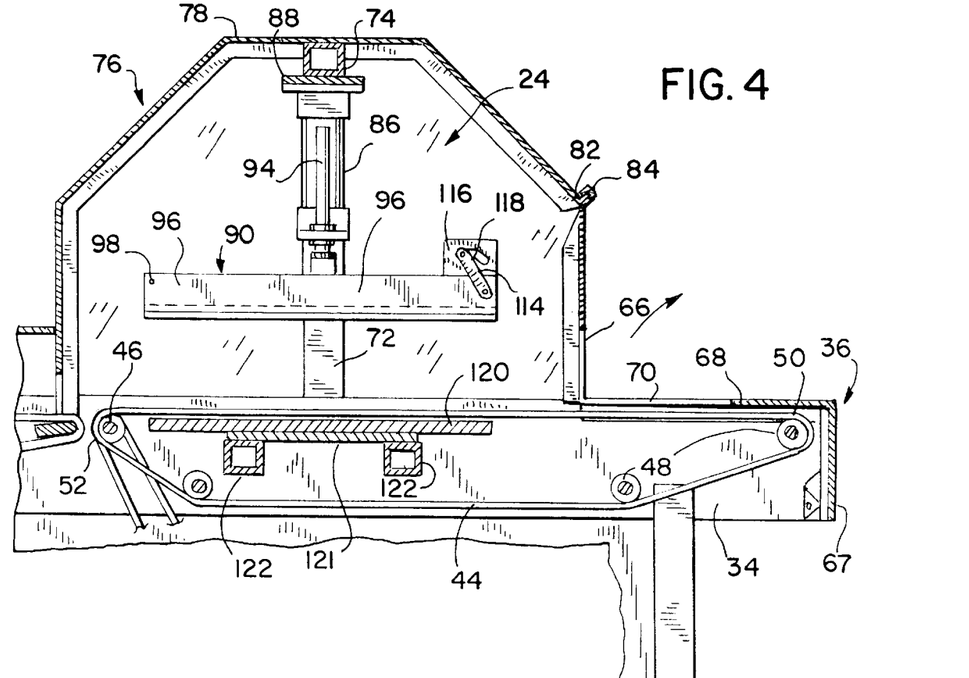
FIG. 4 is a partial section view taken along line 4—4 of FIG. 2 illustrating a press assembly of the pizza crust factory.

Referring now to FIG. 4, an infeed conveyor belt 44 is positioned near the upstream end 36 of the pizza crust factory 20 and is entrained between an infeed conveyor drive shaft 46 and a series of guide rollers 48. The infeed conveyor belt 44 itself extends between an infeed end 50 and a discharge end 52. As can be seen in FIG. 3, the infeed conveyor drive shaft 46 is coupled to a first drive motor 54 by a drive chain 56. When the drive motor 54 is operated, a motor drive shaft 58 rotates in the direction shown by arrow 60, which in turn moves the drive chain 56 as indicated by arrow 62. The drive chain 56 rotates the infeed conveyor drive shaft 46 to cause movement of the infeed conveyor belt 44 in the direction shown by arrow 64. The operation of the drive motor 54 is controlled by an electronic controller (not shown) contained within a control panel 65, best shown in FIG. 2.

Referring back to FIG. 4, the infeed end 50 of the infeed conveyor belt 44 is shielded by a platen access panel 66 that is removably mounted between the horizontal side rails 34 of the support frame 22. The platen access panel 66 must be in the position shown in FIG. 4 before the crust factory 20 can be operated. However, the platen access panel 66 can be removed, as shown in FIG. 5, to allow the user access to both the infeed conveyor belt 44 and the press assembly 24, as will be described in greater detail below.

The platen access panel 66 includes a horizontal tail guard 68 connected to the vertical end portion 67. The horizontal tail guard 68 generally shields most of the infeed end 50 of the infeed conveyor belt 44. As can be seen in FIG. 2, the tail guard 68 includes a dough placement opening 70 that provides access to the upper surface of the infeed conveyor belt 44. The dough placement opening 70 is generally U-shaped and centered with respect to the overall width of the pizza crust factory 20. The dough placement opening 70 provides a guide for the correct placement of a dough ball on the infeed conveyor belt 44 such that the dough ball will be centered beneath the press assembly 24 when the infeed conveyor belt 44 moves the dough ball into the press assembly 24, as will be discussed.

In the preferred embodiment of the invention, the infeed conveyor belt 44 a Teflon belt attached between a pair of laterally spaced drive chains by a plurality of snaps. The Teflon infeed conveyor belt 44 helps to reduce the tendency of the raw dough to stick to the infeed conveyor belt 44 after the crust has been formed in the press assembly 24.

Figure 5:
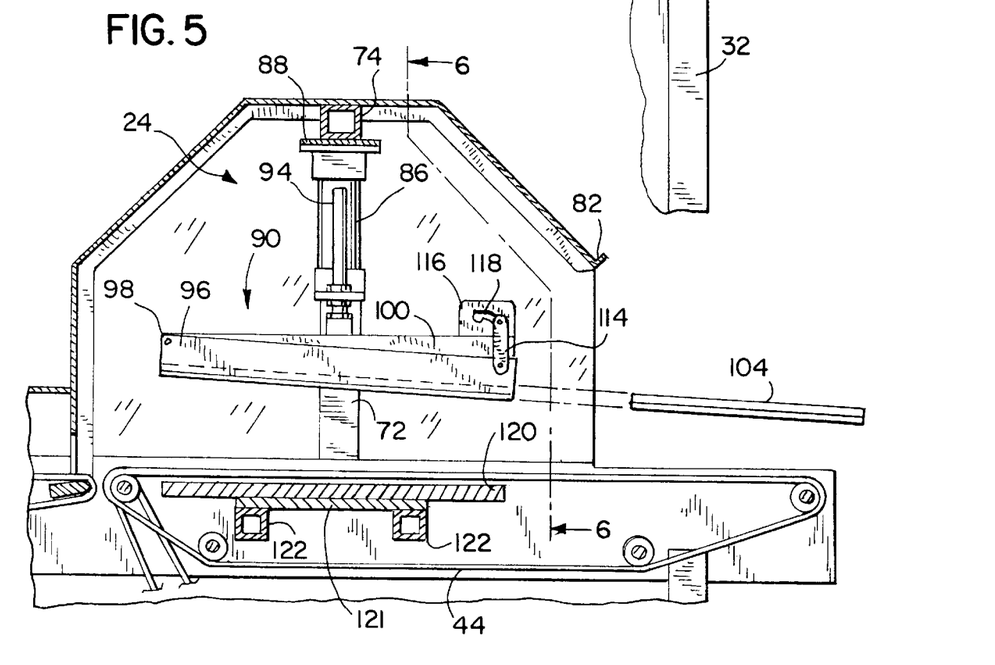
FIG. 5 is a view similar to FIG. 4, illustrating the removal of a crust die plate from the press assembly.
Figure 6:
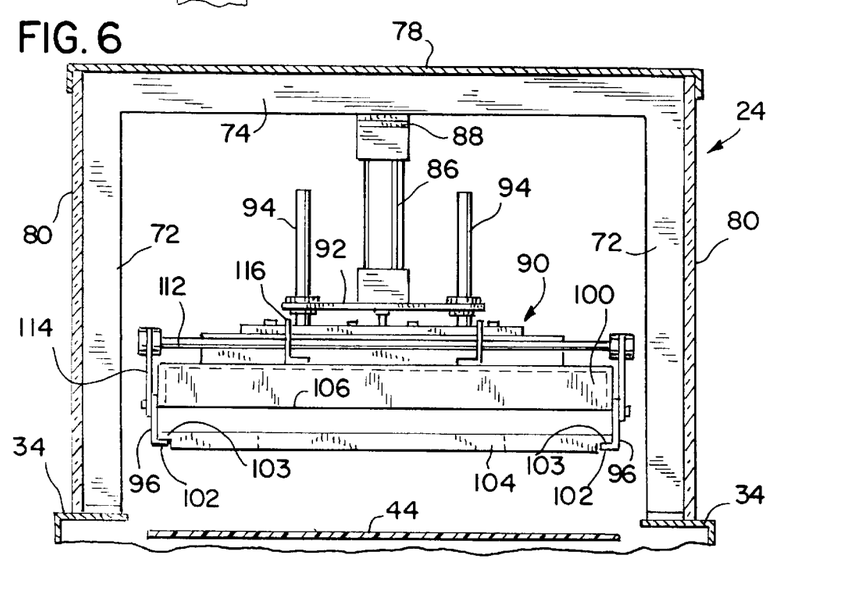
FIG. 6 is a section view taken along line 6—6 of FIG. 5 illustrating a front view of the press assembly.

Referring now to FIGS. 4–6, thereshown are the details of the press assembly 24. The press assembly 24 is positioned between the infeed end 50 and the discharge end 52 of the infeed conveyor belt 44. The press assembly 24 is supported by a press yoke defined by a pair of spaced vertical uprights 72 and a horizontal crossbar 74. The vertical uprights 72, in turn, are each secured to one of the horizontal side rails 34 of the support frame 22 for the pizza crust factory 20.

The press assembly 24 is shielded by a hood 76 consisting of a stainless steel center portion 78 and a pair of transparent side panels 80, as best shown in FIG. 6. The center portion 78 terminates at one end with a tab 82 that is engaged by a hook 84 formed on the platen access panel 66. The interaction between the hook 84 and the tab 82 securely holds the platen access panel 66 in the closed position, as shown in FIG. 4.

Referring now to FIGS. 4 and 6, the press assembly 24 includes a drive cylinder 86 mounted to the horizontal crossbar 74 by a yoke mounting plate 88. The drive cylinder 86 is operable to move a die holder assembly 90 toward and away from the infeed conveyor belt 44. In FIGS. 4 and 6, the drive cylinder 86 is shown in its retracted position such that the die holder assembly 90 is positioned well above the infeed conveyor belt 44. The drive cylinder 86 is mounted at its lower end to an upper stabilizer bracket 92, which in turn also supports a pair of stabilizer bars 94. The stabilizer bars 94 provide additional stabilization for the die holder assembly 90 when the die holder assembly 90 is pushed downward into contact with a dough ball positioned on the infeed conveyor belt 44.

Referring now to FIG. 5, the die holder assembly 90 includes a pair of side support brackets 96 that are each pivotally mounted about a pivot pin 98 to an upper platen 100. The upper platen 100 is connected to a supply of electricity such that the upper platen 100 can be heated for reasons to be described below.

Referring back to FIG. 6, each of the side support brackets 96 is generally L-shaped and includes a horizontal flange 102 that engages an outer ridge 103 of a crust die plate 104. The crust die plate 104 includes a recessed internal cavity 108 (FIG. 8) that defines the desired shape and size for the pizza crust to be formed by the pizza crust factory 20.

When the side support brackets 96 are moved to their locked position, as shown in FIG. 4, the crust die plate 104 is pressed into contact with bottom surface 106 of the upper platen 100, such that heat is transferred from the upper platen 100 to the crust die plate 104. When the side supports 96 are moved to their release position, as shown in FIGS. 5 and 6, the crust die plate 104 is moved out of contact with the upper platen 100 such that the crust die plate 104 can be removed from the die holder assembly 90 for cleaning or replacement by another crust die plate 104. For example, the owner of the pizza crust factory 20 can have multiple crust die plates 104 for forming crusts having different diameters and varying thicknesses.

Figure 7:
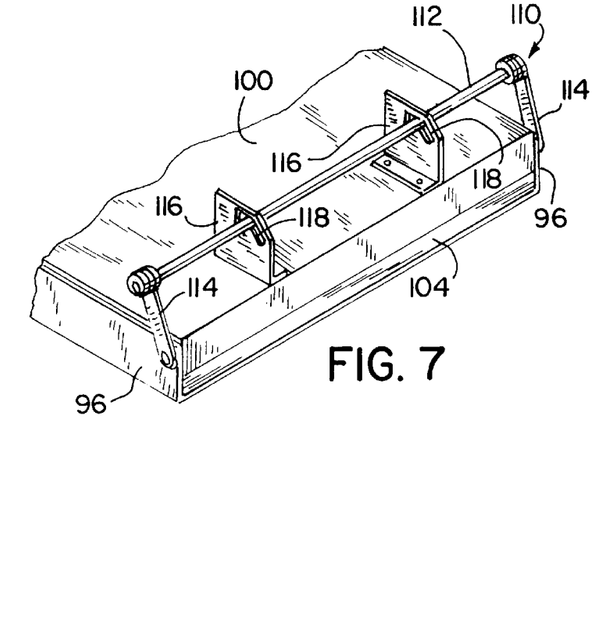
FIG. 7 is a partial perspective view illustrating the locking assembly used to secure the crust die plate in contact with the upper platen of the press assembly.

Referring now to FIG. 7, a locking assembly 110 is positioned on the die holder assembly 90 to secure the pair of side support brackets 96 in their locking position, thereby securing the crust die plate 104 within the die holder assembly 90. The locking assembly 110 includes a draw handle 112 mounted between a pair of linkages 114. Each linkage 114 is pivotally mounted to the forward end of one of the side support bracket 96. A pair of brackets 116, each having a locking slot 118, are mounted to the upper surface of the upper platen 100. The camming action of the draw handle 112 within each locking slot 118 secures the side support brackets 96 in the locking position, as shown in FIG. 7. When the draw handle 112 is pulled downward into the bottom end of the locking slot 118, each of the side support brackets 96 are moved downward to their release position. As previously discussed, when the side support brackets are in the release position, the crust die plate 104 can be removed from the die holder assembly 90. As can be understood in FIGS. 4 and 5, the platen access panel 66 must be removed before the crust die plate 104 can be removed.

In addition to the upper platen 100, the press assembly 24 includes a lower platen 120 positioned beneath the infeed conveyor belt 44. The lower platen 120 is mounted on a platen support plate 121 that is supported by a pair of lower platen supports 122. The platen supports 122, in turn, are mounted transversely between the horizontal side rails 34 of the support frame 22. In the preferred embodiment of the invention, the lower platen 120 is also electrically heated to aid in the formation of the pizza crust on the infeed conveyor belt 44 within the press assembly 24.

Referring now to FIGS. 2 and 3, the docking station 26 is shown mounted between the horizontal side rails 34 of the support frame 22 immediately downstream from the discharge end 52 of the infeed conveyor belt 44. Thus, the docking station 26 receives the crust after it has been formed in the press assembly 24. As shown in FIG. 3, the docking station 26 includes a docker infeed conveyor belt 124 entrained between an infeed drive shaft 126 and a fixed guide bar 128. The docker infeed conveyor belt 124 preferably is a wire mesh conveyor belt positioned slightly below the discharge end 52 of the infeed conveyor belt 44. The docker infeed conveyor belt 124 is positioned such that it receives the crust formed upon the infeed conveyor belt 44.

The infeed drive shaft 126 is driven by a drive chain 130, which in turn is driven by a drive shaft 134. The drive shaft 134 includes a clutch assembly such that it can be driven by either the drive chain 132 or a coupling drive chain 133. The drive chain 132 is driven by a second drive motor 136, while the coupling drive chain is driven by the drive motor 54 through the infeed conveyor drive shaft 46. In this manner, the docker infeed conveyor belt 124 can be driven at the same speed as the infeed conveyor belt 44 through the use of the coupling drive chain 133.

Figure 10:
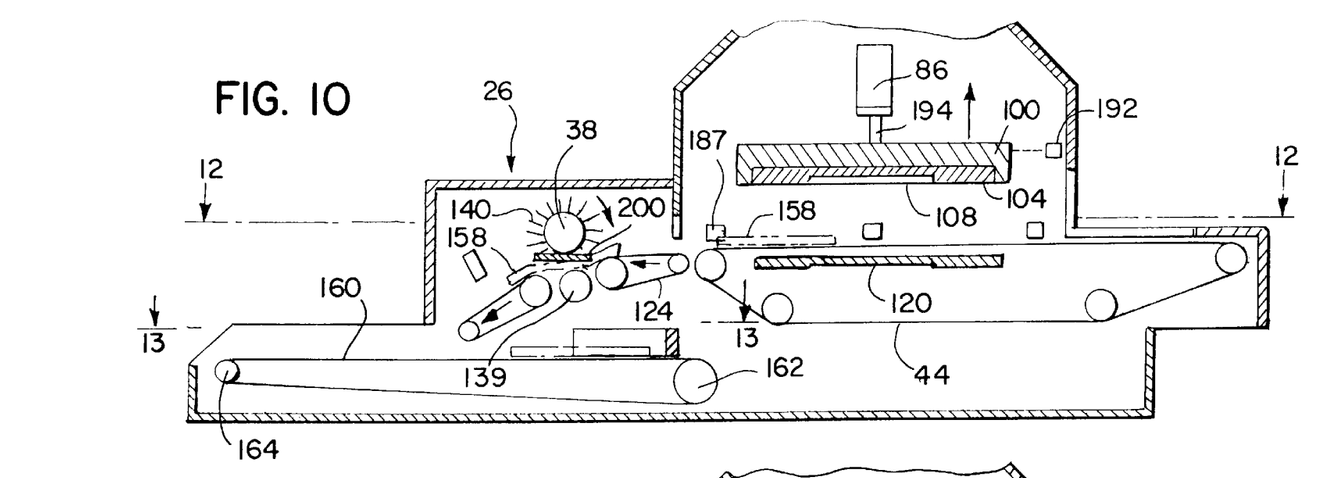

The docker infeed conveyor belt 124 delivers the formed crust to a nip point created between a docker pin roll 138 and a mating docker smooth roll 139, as shown in FIG. 10. The docker pin roll 138 includes a generally cylindrical body portion extending transverse to the length of the pizza crust factory 20 and includes a plurality of pins 140 that extend radially from the cylindrical body. The pins 140 engage and perforate the crust as the crust is moved through the docking station 26. As can be seen in FIG. 2, the docker pin roll 138 includes a pin roll drive shaft 142, which is rotatably supported between a pair of bearing assemblies 141 mounted to opposite sides of the pizza crust factory. Preferably, each of the bearing assemblies 141 includes a release mechanism that allows the docker pin roll 138 to be removed for cleaning.

Referring now to FIGS. 2 and 3, the pin roll drive shaft 142 is coupled to a drive gear 144 and the docker smooth roll 139 is coupled to a drive gear 146. Each drive gear 144 and 146 includes a plurality of teeth that when engaged, cause the mating pin roll 138 and smooth roll 139 to turn in unison by means of the drive chain 147 attached to the drive gear 146. The speed of the lower drive gear 146 can be controlled by either the drive motor 136 or drive motor 148, depending upon the position of the crust within the pizza crust factory 20.

After the crust passes beneath the docker pin roll 138 and is perforated, the crust is received upon a docker outfeed conveyor belt 150. The docker outfeed conveyor belt 150 is entrained between an outfeed drive shaft 152 and a fixed guide bar 154. The docker outfeed conveyor belt 150 is preferably a wire mesh conveyor belt that is angled downward from the outfeed drive shaft 152 to the guide bar 154. The outfeed drive shaft 152 is driven by the drive chain 130, which in turn is driven by one of the drive motors 54,136 or 148 depending upon the position of the crust within the pizza crust factory 20. For example, when the pizza crust is moving through the docking station 26, the docker infeed conveyor belt 124, the lower drive gear 146, and the docker oufeed conveyor belt 150 are all driven at the same speed so that the crust moves smoothly through the docking station 26.

Figure 12:
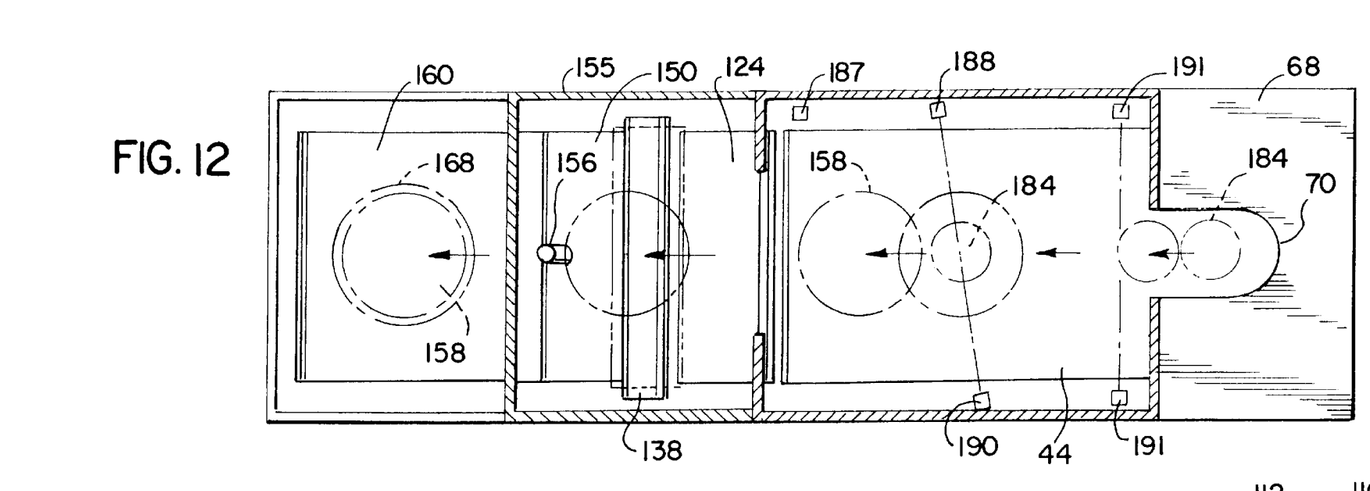
FIG. 12 is a top section view taken along line 12—12 of FIG. 10 illustrating the movement of a pizza crust through the pizza crust factory as viewed from above.

As best shown in FIGS. 1 and 12, the docking station 26 includes a docker guard 155 positioned to enclose the operating components of the docking station 26 during operation of the pizza crust factory 20. In the preferred embodiment of the invention, the docker guard 155 is formed from a transparent material, such as Plexiglas, so that the user can monitor the operation of the pizza crust factory 20 while a crust is being formed. The docker guard 155 preferably includes a contact sensor that prevents operation of the pizza crust factory 20 when the docker guard 155 is open.

Figure 11:
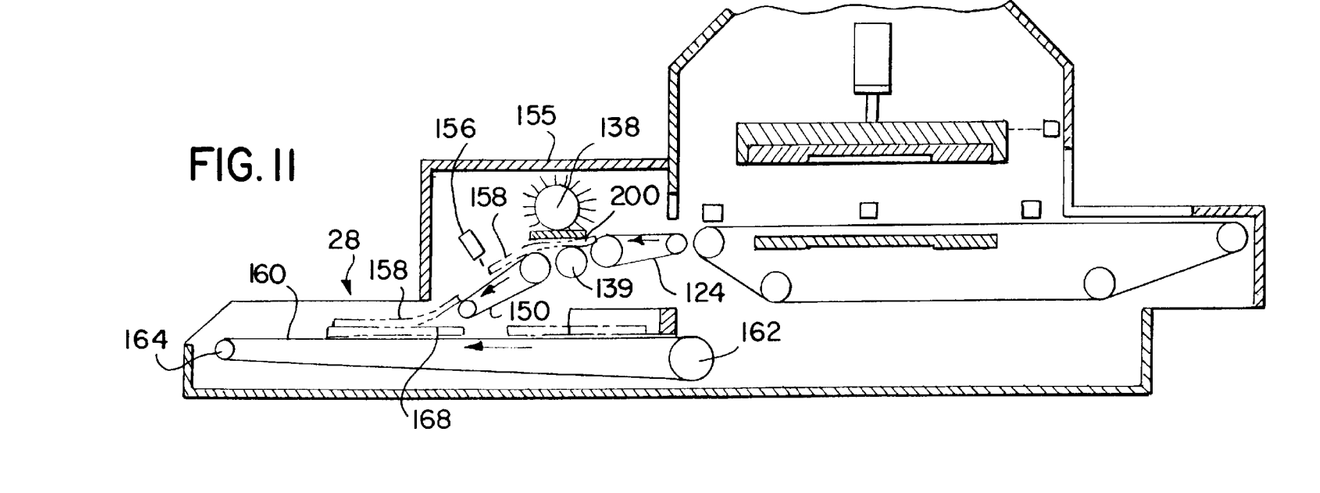

As can be seen in FIG. 11, a crust sensor 156 is positioned above the docker outfeed conveyor belt 150. The crust sensor 156 emits a sensing beam that detects the leading edge of a crust 158 as the crust 158 moves along with the docker outfeed conveyor belt 150. Upon detection of the leading edge of the crust 158, the crust sensor 156 emits a signal to the pizza crust factory controller contained within the control panel 65. Upon receiving such a signal, the controller operates the drive motor 148 to begin moving a panner conveyor belt 160 contained within the panner 28.

Figure 13:
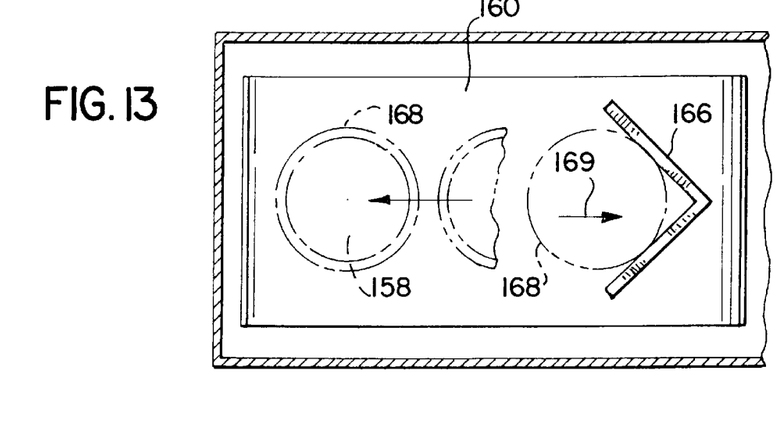
FIG. 13 is a top plan view taken along line 13—13 of FIG. 10 illustrating the position of a crust container in the panning section of the pizza crust factory.

The panner 28 is positioned downstream from the docking station 26 and includes the panner conveyor belt 160 entrained between a drive shaft 162 and an idler shaft 164. As can best be seen in FIGS. 8 and 13, a pan guide 166 is positioned slightly above the surface of the panner conveyor belt 160 near the upstream end of the panner conveyor belt 160. The pan guide 166 is a generally V-shaped structure that provides a positive stop for a crust container 168 as it is positioned in the panner as shown by arrow 169. In the preferred embodiment of the invention, the crust container 168 is either a wire mesh screen or a conventional pizza pan, each of which have a circular shape. The pan guide 166 positions the crust container 168 in a known position such that the electronic controls for the pizza crust factory 20 can operate the panner conveyor belt 160 to receive the crust from the docker outfeed conveyor belt 150 on the crust container being moved by the panner conveyor belt 160.

Referring now to FIG. 2, the panner conveyor belt 160 defines the downstream end for the pizza crust factory 20 and extends outwardly from the docker guard 155. The pizza crust formed by the pizza crust factory 20 and contained on the crust container 168 can be removed from the panner conveyor belt 160 at the location extending from the docker guard 155.

The operation of the pizza crust factory 20 in forming a pizza crust and depositing the crust on a crust container 168 will now be discussed with reference being made to the Figures. Initially, before the pizza factory 20 is used, the user sets the desired operating parameters for the pizza crust factory 20 on the control panel 65, as shown in FIG. 2. In the embodiment of the invention shown, the control panel 65 includes an upper platen temperature dial 172 and a lower platen temperature dial 174. The temperature dials 172 and 174 allow the user to set the desired temperatures for both the upper platen 100 and the lower platen 120 contained within the press assembly 24. A press timer 176 allows the user to set the desired dwell time for the upper platen 100 in its press position during the formation of the crust within the press assembly 24. The press timer 176 allows the operator of the pizza crust factory 20 to form uniform crusts by using a consistent press time. A heater power switch 178, start switch 180 and emergency stop button 182 are also contained on the control panel 66 to allow the user to control the operation of the pizza crust factory 20.

Figure 8:
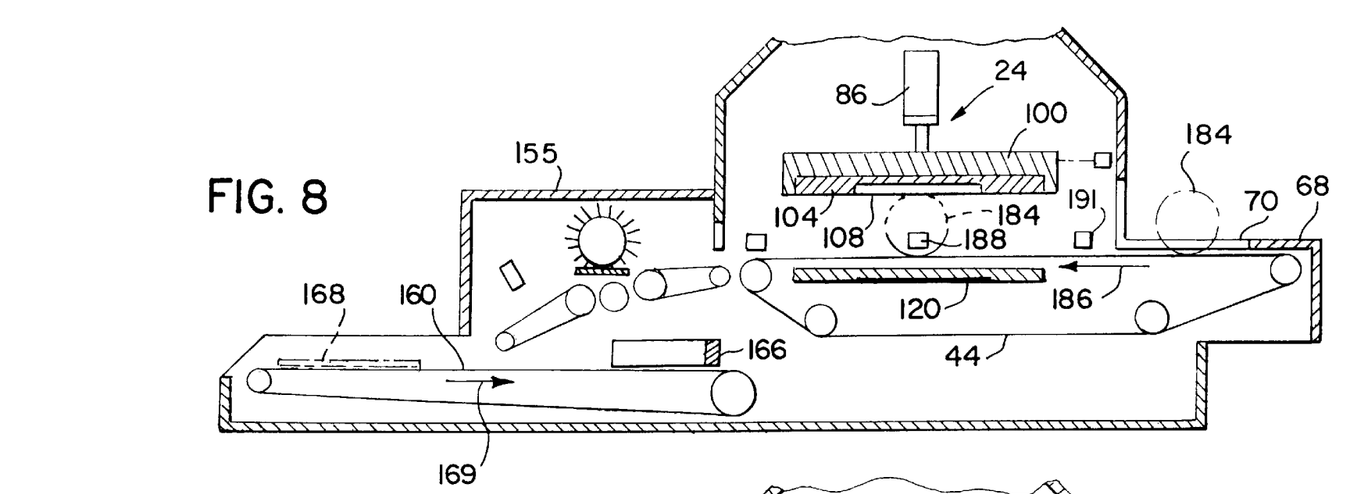
FIGS. 8–11 schematically illustrate the steps performed by the pizza crust factory during the formation of a pizza crust.

Once the desired operating parameters for the pizza crust factory 20 have been set on the control panel 65, a dough ball 184 is positioned on the infeed conveyor belt 44, as shown in FIGS. 8 and 12. Specifically, the dough ball 184 is positioned in the dough placement opening 70 formed in the tail guard 68.

After the dough ball 184 has been placed upon the infeed conveyor belt 44, the user depresses the start button 180 which causes the drive motor 54 to move the infeed conveyor belt 44 in the direction shown by arrow 186 in FIG. 8.

As previously mentioned, the infeed conveyor belt 44 is a Teflon belt attached to a pair of laterally spaced drive chains by a plurality of snaps. One of the drive chains associated with the infeed conveyor belt 44 includes a series of tabs spaced along the length of the drive chain. A proximity sensor 187, as shown in FIG. 12, is fixed to the support frame along the path of the drive chain coupled to the infeed conveyor belt 44. The proximity sensor 187 detects the tabs positioned on the drive chain and generates a signal that turns off the drive motor 54 to stop movement of the infeed conveyor belt 44. The tabs on the drive chain are spaced such that the drive motor 54 moves the infeed conveyor belt 44 a specific distance such that a dough ball 184 positioned within the dough placement opening 70 is transported to the center of the press assembly 24.

As can be seen in FIG. 12, a photoelectric emitter 188 is positioned on one side of the infeed conveyor belt 44 and emits a beam of light across the infeed conveyor belt 44 that is detected by a detector 190. If a dough ball 184 is present beneath the press assembly 24, the beam of light is broken, which indicates that the press assembly 24 can be operated. If the emitter 188 and detector 190 do not detect the presence of a dough ball 184, the electronic controller for the pizza crust factory 20 prevents the operation of the press assembly 24.

Figure 9:
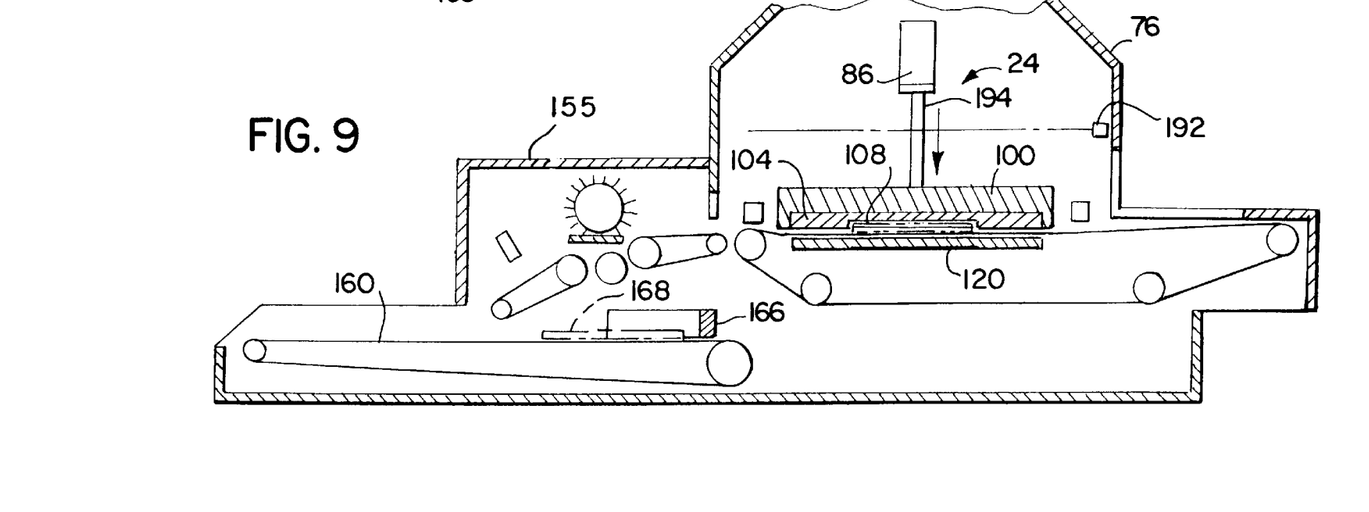

Referring now to FIG. 9, if a dough ball 184 is detected below the press assembly 24, the drive cylinder 86 is activated to force the upper platen 100 and crust die plate 104 downward into contact with the dough ball 184. As previously discussed, the crust die plate 104 includes an internal cavity 108 that defines the desired shape for the pizza crust to be formed. The heated upper platen 100 and crust die plate 104 are held in their downward position for a dwell time set by the press timer 176 to heat the crust once it is flattened into its desired shape. The dwell time which the crust die plate 104 is held in contact with the dough reduces the amount of spring back of the crust once the crust die plate 104 is lifted out of contact with the crust. Therefore, the heated upper platen 100 and the heated lower platen 120 function to "set" the crust shape after it has been created by the downward, pressing action of the crust die plate 104.

As can be seen in FIG. 12, a sensor 191, including both an emitter and a detector, is positioned to emit a beam of light across the width of the infeed conveyor belt 44 near the entrance to the press assembly 24. The sensor 191 is used to detect the presence of the user's hand and prevents operation of the press assembly 24 should the optical beam be broken.

Once the dwell time, as set by the press timer 176, has timed out and the crust has been formed by the combination of the upper platen 100 and lower platen 120, the drive cylinder 86 retracts the cylinder rod 194 to move the upper platen 100 into its retracted position, as shown in FIG. 10. As the upper platen 100 gains full retraction, the upper platen 100 engages an upper proximity sensor 192. When engaged, the upper proximity sensor 192 energizes both the drive motor 54 and the drive motor 136. The drive motor 54 moves the infeed conveyor belt 44 forward until the next tab on the drive chain connected to the infeed conveyor belt 44 is sited by the proximity sensor 187, which again stops the drive motor 54.

The movement of the infeed conveyor belt 44 causes the crust 158 to be received upon the docker infeed conveyor belt 124. After the drive motor 54 has been turned off by the proximity sensor 187, the docker infeed conveyor belt 124 is driven by the drive motor 136.

As shown in FIG. 10, the docker infeed conveyor belt 124 transfers the crust 158 between the docker pin roll 138 and the mating docker smooth roll 139. A stripper plate 200, including slots aligned with the pins 140 contained on the docker pin roll 138, is positioned above the crust 158 to ensure that the crust 158 does not get stuck on the pin roll 138.

After the crust 158 passes through the docker pin roll 138, the leading edge of the crust is sensed by the crust sensor 156, as shown in FIG. 11. Upon detection of the leading edge of the crust 158, the sensor 156 energizes the drive motor 148, which drives the panner conveyor belt 160. The crust sensor 156 also de-energizes the drive motor 136 and the docker assembly 26 is then run by the drive motor 148 since it is slaved to the panner conveyor belt 160 by a clutch assembly. Thus, the panner conveyor belt 160 is driven at the same speed as the docker ouffeed conveyor belt 150 such that the crust 158 is correctly positioned upon the crust container 168.

After the crust 158 has been placed upon the crust container 168, the drive motor 148 is stopped by a timer such that the crust container 168 stops near the end of the panner conveyor belt 160 and can be removed from the pizza crust factory 20 and either topped with pizza toppings or stored for later use.

As can be understood when viewing FIGS. 8 and 12, if a second dough ball 184 is positioned on the infeed conveyor belt 44 while the first dough ball 184 is being pressed into the desired crust shape, the pizza crust factory 20 will index the second dough ball 184 beneath the press assembly 24 while the formed crust is transferred to the docking station 26. This process can be continuously repeated to sequentially form a number of pizza crusts from pre-prepared dough balls.

After each crust is formed and placed upon a crust container 168, the crust container including the crust is removed from the pizza factory 20 and an additional crust container 168 is pushed into contact with the pan guide 166 positioned above the panner conveyor belt 160. Since the upper platen 100 has a dwell time during the formation of the crust within the press assembly 24, the removal of the crust container 168 including a formed crust and the placement of an empty crust container 168 in contact with the pan guide 166 can be easily performed by the operator of the pizza crust factory 20.

Various alternatives and embodiments are contemplated as being within the scope of the following claims particularly pointing out and distinctly claiming the subject matter regarded as the invention.

We claim:

1. A self-contained apparatus for forming a crust from a raw supply of dough, the apparatus comprising:

a support frame defining a crust-forming path extending between an upstream end and a downstream end of the support frame;

an infeed conveyor belt positioned on the support frame for transporting the raw supply of dough from the upstream end of the support frame, the infeed conveyor belt extending between an infeed end and a discharge end;

a press assembly mounted to the support frame between the infeed end and the discharge end of the infeed conveyor belt, the press assembly being operable to press the raw supply of dough into the desired crust shape;

a docking station mounted to the support frame adjacent to the discharge end of the infeed conveyor belt, the docking station being operable to perforate the crust and transport the crust from the discharge end of the infeed conveyor belt through the docking station; and a panner mounted to the support frame adjacent to the docking station, the panner being operable to receive the perforated, formed crust from the docking station on a crust container.

2. The apparatus of claim 1 wherein the press assembly includes a fixed lower platen positioned below the infeed conveyor belt and a movable upper platen positioned above the infeed conveyor belt, the upper platen being movable into contact with the supply of dough positioned on the infeed conveyor belt to press the dough into the desired crust shape.

3. The apparatus of claim 2 wherein the upper platen and the lower platen are both heated.

4. The apparatus of claim 1 further comprising a press timer that controls the amount of time the upper platen is held in contact with the supply of dough to form the crust.

5. The apparatus of claim 2 wherein the press assembly includes a die holder assembly for securing the upper platen in contact with a crust die plate, the crust die plate having a die cavity defining the desired crust shape.

6. The apparatus of claim 5 wherein the die holder assembly includes a pair of side supports pivotally mounted to the upper platen and movable between a locking position and a release position, wherein the crust die plate can be removed from the die holder assembly when the side supports are in the release position and the crust die plate is secured in contact with the upper platen when the side supports are in the locking position.

7. The apparatus of claim 6 wherein the die holder assembly includes a locking mechanism coupled to the side supports to secure the side supports in the locking position.

8. The apparatus of claim 1 wherein the infeed conveyor belt is Teflon coated.

9. The apparatus of claim 1 wherein the docking station includes a docker pin roll rotatably mounted to the support frame about a rotational axis transverse to the crust-forming path, the docker pin roll including a plurality of pins extending radially from the rotational axis of the docker pin roll.

10. The apparatus of claim 9 wherein the docking station further includes an outfeed conveyor belt positioned to receive the crust from the docker pin roll and transfer the crust to the panner.

11. The apparatus of claim 10 further comprising a sensor positioned above the outfeed conveyor belt to detect the leading edge of a crust traveling along the outfeed conveyor belt.

12. The apparatus of claim 11 wherein the panner conveyor belt is operated upon detection of the leading edge of a crust on the outfeed conveyor belt.

13. The apparatus of claim 12 wherein the panner includes a pan guide member positioned above the panner conveyor belt, the pan guide defining a base position for the crust container such that the leading edge of the crust will correctly enter the crust container upon activation of the panner conveyor belt.

14. The apparatus of claim 1 further comprising a sensor positioned to detect the presence of the raw supply of dough on the infeed conveyor belt beneath the press assembly, wherein the sensor permits operation of the press assembly only when a supply of dough is beneath the press assembly.

15. A self-contained apparatus for forming a crust from a ball of dough, the apparatus comprising:

a support frame defining a crust-forming path extending between an upstream end and a downstream end;

an infeed conveyor belt mounted to the support frame and positioned to transport the ball of dough from the upstream end of the support frame, the infeed conveyor belt extending between an infeed end and a discharge end;

a press assembly mounted to the support frame and positioned between the infeed end and the discharge end of the infeed conveyor assembly, the press assembly including a mechanical drive member operable to press the dough ball into the desired crust shape;

a docking station mounted to the support frame and positioned downstream from the press assembly, the docking station being adapted to receive the formed crust from the infeed conveyor belt, the docking station including a rotatable docker pin roll having a rotational axis positioned transverse to the crust-forming path, the docker pin roll operating to perforate the formed crust as the crust moves through the docking station along the crust-forming path; and a panner positioned downstream from the docking station for receiving the perforated, formed crust on a crust container, the panner including a panner conveyor belt operated in combination with the docking station to receive the crust on the crust container and transport the crust container to the downstream end of the crust-forming path.

16. The apparatus of claim 15 wherein the docking station includes an outfeed conveyor belt positioned downstream from the docker pin roll, the outfeed conveyor belt being positioned to transfer the perforated crust from the docker pin roll to the panner.

17. The apparatus of claim 16 further comprising a sensor positioned above the outfeed conveyor belt for detecting the leading edge of the crust, wherein the sensor enables operation of the panner conveyor belt upon detection of the leading edge of the crust.

18. The apparatus of claim 15 wherein the press assembly includes a fixed lower platen positioned below the infeed conveyor belt and a movable upper platen positioned above the infeed conveyor belt, the upper platen being movable by the mechanical drive member into contact with the ball of dough positioned on the infeed conveyor belt to press the ball of dough into the desired shape of the crust.

19. The apparatus of claim 18 further comprising a press timer that control the amount of time the mechanical drive member is activated to hold the upper platen in contact with the supply of dough.

20. The apparatus of claim 18 wherein the upper platen and the lower platen are heated.

21. The apparatus of claim 18 wherein the press assembly includes a die holder assembly for securing the upper platen in contact with a crust die plate, the crust die plate having a die cavity defining the desired crust shape.

22. The apparatus of claim 21 wherein the die holder assembly includes a pair of side supports pivotally mounted to the upper platen and movable between a locking position and a release position, wherein the crust die plate can be removed from the die holder assembly when the side supports are in the release position and the crust die plate is secured in contact with the upper platen when the side supports are in the locking position.

23. The apparatus of claim 15 further comprising a dough sensor positioned to detect the presence of a dough ball beneath the press assembly, wherein the sensor enables operation of the press assembly only upon detection of the dough ball.

* * * * *

UNITED STATES PATENT AND TRADEMARK OFFICE
CERTIFICATE OF CORRECTION

PATENT NO. : 6,026,738
DATED : February 22, 2000
INVENTOR(S) : Charles et al.

It is certified that error appears in the above-indentified patent and that said Letters Patent is hereby corrected as shown below:

In claim 16, line 19 delete "ouffeed" and substitute therefor --outfeed--; in claim 16, line 20, delete "ouffeed" and substitute therefor --outfeed--.

Signed and Sealed this

Fourteenth Day of November, 2000

*Attest:*

Q. TODD DICKINSON

*Attesting Officer*      *Director of Patents and Trademarks*